United States Patent
Wight

(10) Patent No.: US 12,402,616 B2
(45) Date of Patent: Sep. 2, 2025

(54) CASTABLE OBJECT SYSTEM

(71) Applicant: Ardent, LLC, Salt Lake City, UT (US)

(72) Inventor: Wayson Wight, Salt Lake City, UT (US)

(73) Assignee: Ardent, LLC, Salt Lake City, UT (US)

( * ) Notice: Subject to any disclaimer, the term of this patent is extended or adjusted under 35 U.S.C. 154(b) by 170 days.

(21) Appl. No.: 17/412,129

(22) Filed: Aug. 25, 2021

(65) Prior Publication Data

US 2022/0061296 A1     Mar. 3, 2022

Related U.S. Application Data

(60) Provisional application No. 63/071,223, filed on Aug. 27, 2020.

(51) Int. Cl.
| | | |
|---|---|---|
| *A01K 85/01* | (2006.01) | |
| *A01K 91/04* | (2006.01) | |
| *A01K 97/12* | (2006.01) | |
| *H04Q 9/00*  | (2006.01) | |

(52) U.S. Cl.
CPC ............ *A01K 97/125* (2013.01); *A01K 85/01* (2013.01); *A01K 85/015* (2022.02); *A01K 91/04* (2013.01); *H04Q 9/00* (2013.01); *H04Q 2209/47* (2013.01)

(58) Field of Classification Search
CPC .... A01K 85/015; A01K 85/01; A01K 85/005; A01K 85/16; A63F 9/305; A63F 9/34; A63F 2250/12
USPC .......................................... 446/139; 273/343
See application file for complete search history.

(56) References Cited

U.S. PATENT DOCUMENTS

| | | | | |
|---|---|---|---|---|
| 2,557,789 A | * | 6/1951 | Lamka ...................... | A63F 9/34 446/139 |
| 2,598,487 A | * | 5/1952 | Anechiarico ............. | A63F 9/34 446/132 |
| 2,703,469 A | * | 3/1955 | Raizen .................... | A63F 9/305 273/447 |
| 2,955,379 A | * | 10/1960 | Dell ....................... | A01K 95/00 16/442 |

(Continued)

FOREIGN PATENT DOCUMENTS

| | | | |
|---|---|---|---|
| CA | 2201787 A1 | * | 10/1998 |
| CN | 109954271 A | * | 7/2019 |

(Continued)

OTHER PUBLICATIONS

"Hook and Loop: Velcro® Brand Textile Fasteners and Closures." Velcro, Jul. 19, 2022, https://www.velcro.com/business/products/textile-hook-and-loop/. (Year: 2022).*

(Continued)

*Primary Examiner* — Jack W Keith
*Assistant Examiner* — Angelica Alejandra Almeida Bonnin

(57) ABSTRACT

A castable object includes: a structure including a first distal end and a second distal end; a fastener coupled to the first distal end, where the fastener is configured to couple to a fishing system; and a first fastening surface attached to at least the second distal end, where the castable object is configured to be cast by the fishing system onto a target, and where the first fastening surface is configured to removably attach to a second fastening surface of the target.

19 Claims, 11 Drawing Sheets

(56) References Cited

U.S. PATENT DOCUMENTS

| | | | | |
|---|---|---|---|---|
| 3,032,345 | A * | 5/1962 | Lemelson | F41J 3/0052 |
| | | | | D21/387 |
| 3,659,372 | A | 5/1972 | Cullen | |
| 3,764,138 | A * | 10/1973 | Schild | A63F 9/305 |
| | | | | 273/447 |
| 3,788,641 | A * | 1/1974 | Lemelson | A63F 9/34 |
| | | | | 273/DIG. 30 |
| 3,857,566 | A * | 12/1974 | Lemelson | F42B 6/003 |
| | | | | 273/DIG. 30 |
| 3,864,872 | A * | 2/1975 | Hoetzel | A63F 9/34 |
| | | | | 273/448 |
| 4,017,076 | A * | 4/1977 | Bai | A63B 59/20 |
| | | | | 273/412 |
| 4,113,251 | A * | 9/1978 | Imes, Jr. | A63F 9/0208 |
| | | | | 273/DIG. 30 |
| 4,240,639 | A * | 12/1980 | Bolton | A63B 43/005 |
| | | | | 473/573 |
| D259,354 | S * | 5/1981 | Derrington | D21/711 |
| 4,718,677 | A * | 1/1988 | Barnes | A63B 59/20 |
| | | | | 273/DIG. 30 |
| 4,749,195 | A * | 6/1988 | Lee | A63F 9/305 |
| | | | | 273/447 |
| 4,783,076 | A * | 11/1988 | Lee | A63F 9/305 |
| | | | | 273/447 |
| 4,971,334 | A * | 11/1990 | Stewart | A63B 43/005 |
| | | | | 473/573 |
| 4,976,439 | A * | 12/1990 | Kraemer | A63B 67/10 |
| 5,031,908 | A * | 7/1991 | Spector | A63F 9/305 |
| | | | | 273/458 |
| 5,100,152 | A * | 3/1992 | Butler, III | A63B 43/005 |
| | | | | 473/573 |
| 5,110,136 | A * | 5/1992 | Land | A63F 9/305 |
| | | | | 273/348.4 |
| 5,139,273 | A * | 8/1992 | Rudell | A63B 43/005 |
| | | | | 473/573 |
| 5,141,465 | A * | 8/1992 | Stellman | A63F 9/305 |
| | | | | 273/DIG. 30 |
| D335,168 | S * | 4/1993 | Cocanougher | D22/145 |
| 5,213,324 | A * | 5/1993 | Bowers | A63B 69/0002 |
| | | | | 473/235 |
| 5,286,033 | A * | 2/1994 | Wayne | A63B 67/06 |
| | | | | 273/377 |
| 5,294,130 | A * | 3/1994 | Woods | F41B 15/00 |
| | | | | 273/DIG. 30 |
| 5,397,131 | A * | 3/1995 | Kraemer | A63F 9/305 |
| | | | | 273/350 |
| 5,566,949 | A * | 10/1996 | Gorden | A63B 69/0086 |
| | | | | 473/576 |
| 5,657,995 | A * | 8/1997 | Howard | A63F 9/305 |
| | | | | 446/311 |
| 5,782,701 | A * | 7/1998 | O'Bryan | A63B 69/3655 |
| | | | | 273/DIG. 30 |
| 5,941,528 | A * | 8/1999 | Boivin, Jr. | A63F 9/305 |
| | | | | 273/401 |
| 6,022,025 | A * | 2/2000 | Chuang | A63H 13/02 |
| | | | | 273/443 |
| 6,412,211 | B1 * | 7/2002 | Smith | A01K 97/00 |
| | | | | 43/4 |
| 6,604,742 | B2 * | 8/2003 | El Sabbagh | A63B 67/06 |
| | | | | 473/573 |
| 6,910,895 | B1 * | 6/2005 | Gevedon | G09B 19/00 |
| | | | | 434/247 |
| D513,303 | S * | 12/2005 | Stark, Jr. | D22/145 |
| 7,347,790 | B2 * | 3/2008 | Zimmerman | A63B 69/3655 |
| | | | | 273/DIG. 30 |
| 7,607,665 | B2 * | 10/2009 | Jordan | F41J 3/0057 |
| | | | | 273/348.3 |
| 7,708,278 | B2 * | 5/2010 | Norbits | A63F 9/305 |
| | | | | 273/140 |
| 9,339,697 | B2 | 5/2016 | Luciano et al. | |
| 10,065,095 | B2 * | 9/2018 | Gallagher | A63F 9/305 |
| 10,226,680 | B2 * | 3/2019 | Simms | A63B 43/005 |
| 11,202,970 | B2 * | 12/2021 | Wendorff | A63H 33/3072 |
| 2003/0176228 | A1 * | 9/2003 | Santa Cruz | A63B 69/3617 |
| | | | | 473/588 |
| 2004/0204258 | A1 | 10/2004 | Hanoun | |
| 2007/0102884 | A1 * | 5/2007 | Hinz | A63F 9/02 |
| | | | | 273/317.2 |
| 2009/0079135 | A1 * | 3/2009 | Norbits | A63F 9/305 |
| | | | | 273/348.5 |
| 2011/0070983 | A1 * | 3/2011 | Yukihiro | A63H 33/18 |
| | | | | 473/615 |
| 2016/0045799 | A1 * | 2/2016 | Gallagher | A63B 63/007 |
| | | | | 273/335 |
| 2021/0245040 | A1 * | 8/2021 | Eugenia | A63F 9/34 |

FOREIGN PATENT DOCUMENTS

| | | | | |
|---|---|---|---|---|
| GB | 2309916 A | * | 8/1997 | A63F 9/34 |
| KR | 20090009050 U | * | 9/2009 | |
| KR | 101227693 B1 | * | 1/2013 | |
| KR | 101247330 B1 | * | 3/2013 | |
| KR | 101267195 B1 | * | 5/2013 | |
| KR | 101838849 B1 | * | 3/2018 | |
| KR | 20190066822 A | * | 6/2019 | |
| WO | WO-2005077163 A1 | * | 8/2005 | A01K 85/01 |
| WO | WO-2005084432 A1 | * | 9/2005 | A01K 85/01 |

OTHER PUBLICATIONS

"Know Your Materials: Polypropylene (PP)." Fast Radius, 14 Sep. 2022, https://www.fastradius.com/resources/know-your-materials-polypropylene/#:~:text=Polypropylene's%20properties%20and%20mechanical%20specifications&text=For%20all%20its%20strength%20and,enough%20to%20bend%20without%20breaking. (Year: 2022).*

"Polyamide Conduit." AerosUSA, 2023, https://aerosusa.com/products/rohrflex-conduit/#:~:text=Polyamide%20Conduit,is%20used%20in%20many%20industries. (Year: 2023).*

DesMarais, Max. "Types of Fishing Swivels (and How to Choose the Right One)." Hiking and Fishing, Oct. 1, 2022, https://hikingandfishing.com/types-of-fishing-swivels/. (Year: 2022).*

Paul, John. "Best Magnetic Dartboards of 2023—Full Guide & Reviews by Prof." PeakPicker, Feb. 20, 2019, https://peakpicker.com/best-magnetic-dart-board/. (Year: 2019).*

Rod Power. Big Bear Fishing Rods. (2024). https://www.bigbearrods.com/pages/line-weight-lure-weight (Year: 2024).*

"Eagle Claw Rubber Practice Plugs." Walmart, May 3, 2019, www.walmart.com/ip/Eagle-Claw-Rubber-Practice-Plugs-3-8-oz-Per-2/43956388?classType=REGULAR (Year: 2019).*

Rod Power. Big Bear Fishing Rods. (n.d.). https://www.bigbearrods.com/pages/line-weight-lure-weight] (Year: 2024).*

"07—Practicing Casting Techniques at Home." YouTube, uploaded by Pennsylvania Fish and Boat Commission, Jun. 25, 2020, https://www.youtube.com/watch?v=KTCvpRtdjK4. (Year: 2020).*

International Search Report and Written Opinion dated Dec. 15, 2021 for PCT Application No. PCT/US2021/047789.

* cited by examiner

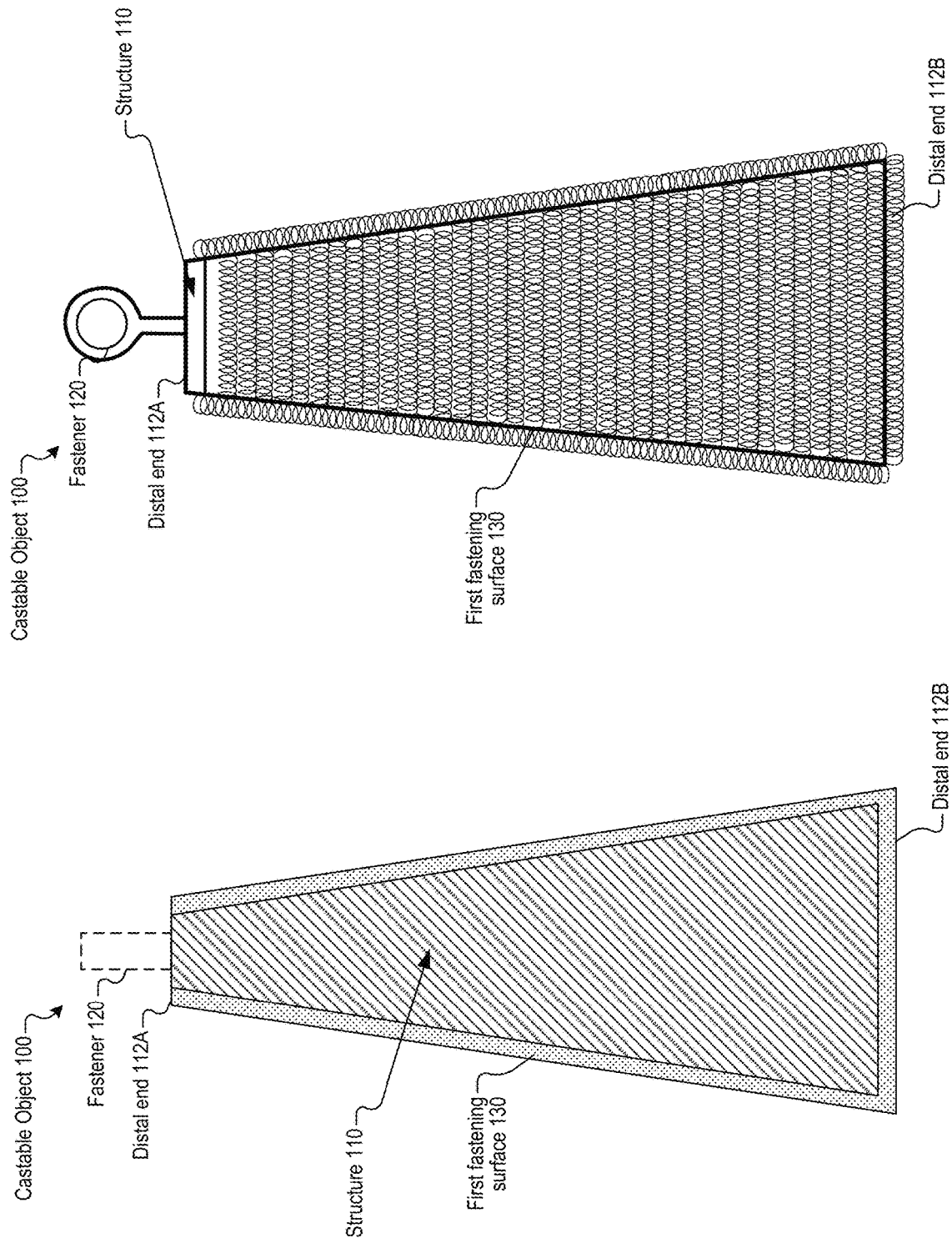

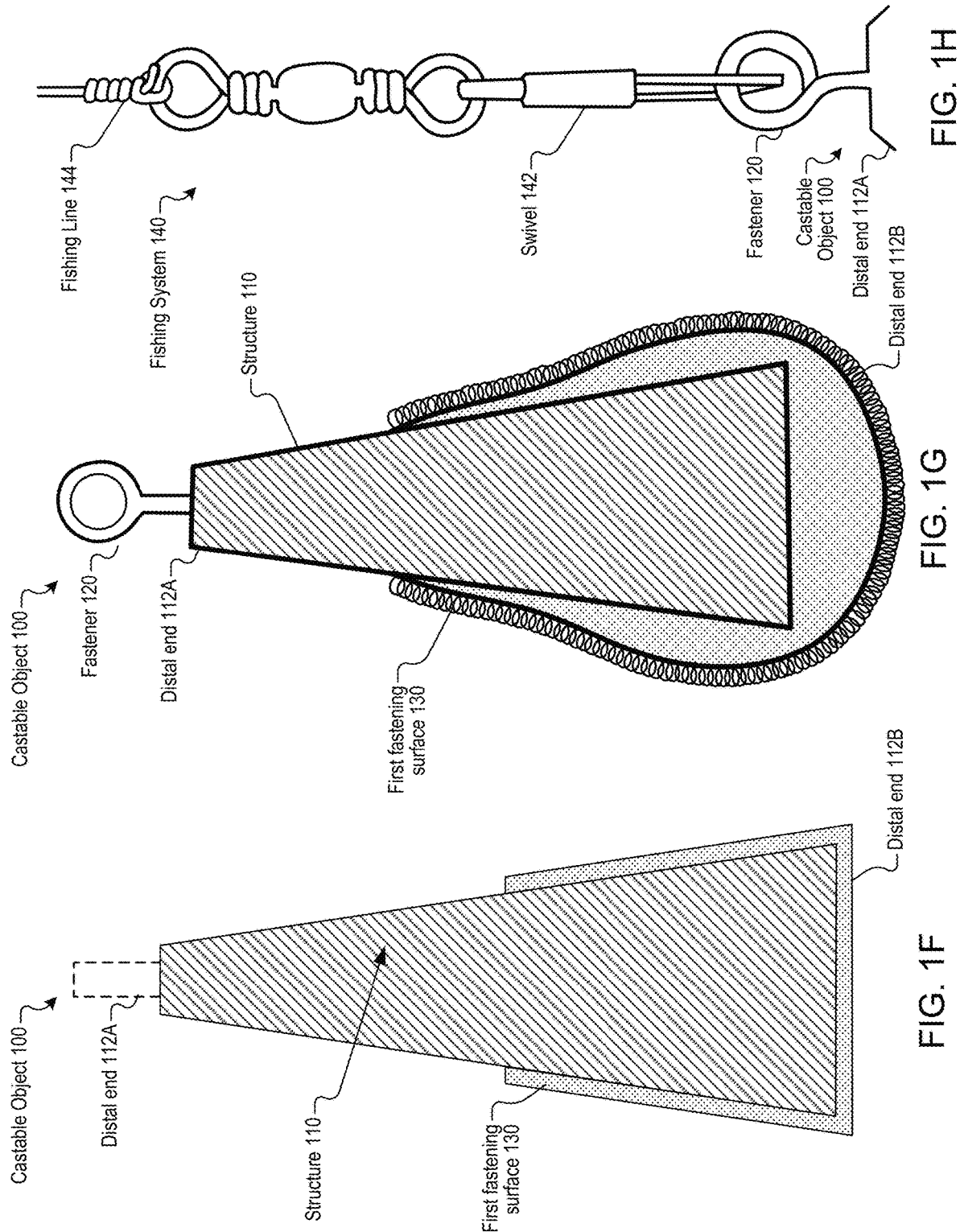

CASTABLE OBJECT SYSTEM

RELATED APPLICATIONS

This application claims the benefit of U.S. Provisional Application No. 63/071,223, filed Aug. 27, 2020, the contents of which are hereby incorporated by reference in their entirety.

TECHNICAL FIELD

Embodiments of the present disclosure relate to a castable object, and in particular to a castable object system.

BACKGROUND

Fishing gear is used by anglers to capture fish and other animals from a body of water. Fishing gear may include fishing tackle (e.g., hooks, lures, spinners, swivels) attached to a fishing line which is coupled to a casting device (e.g., fishing rod, fishing reel, fly rod, etc.). The casting device may be swung (e.g., from behind or the side of the angler towards the body of water) to throw the fishing tackle over the water so that the fishing tackle will enter the body of water at a particular location. Swinging the casting device to throw the fishing tackle over the water may be referred to as casting the fishing tackle. After casting, the fishing line may be pulled towards the angler (e.g., by reeling the fishing reel coupled to the fishing rod, by manually pulling the fishing line, etc.) to pull the fishing tackle towards the angler. Once the fishing tackle has returned to the angler, the angler may re-throw the fishing tackle over the water using the casting device and re-pull the fishing tackle towards the angler over and over.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIGS. 1A-H illustrate castable objects, according to certain embodiments.

DETAILED DESCRIPTION OF EMBODIMENTS

Figure 1B:
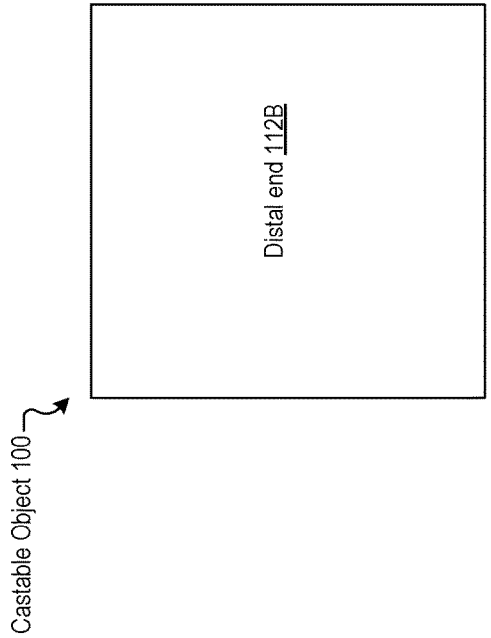

Embodiments described herein are related to a castable object system. Angling (e.g., fishing) is a method of capturing fish or other animals by using fishing gear. Fishing gear may include fishing tackle that has an angle, hook, and/or barbed portion. The fishing tackle is coupled to a fishing line (e.g., cord used for angling) and the fishing line is coupled to a casting device. Casting may refer to throwing the fishing tackle over a body of water by swinging the casting device to cause the fishing tackle to enter the body of water at a particular location (e.g., while the fishing tackle and the casting device are both coupled to the fishing line). The fishing tackle is pulled towards the casting device via the fishing line (e.g., by reeling the fishing line via a fishing reel, by manually pulling the fishing line, etc.). After the fishing tackle arrives proximate the casting device, the fishing tackle may be re-cast by swinging the casting device to cause the fishing tackle to re-enter the water at a particular location. This is repeated multiple times to cause the fishing tackle to enter the water at one or more locations to capture fish or other animals.

Casting of the fishing tackle is to be performed in a particular manner to avoid problems such as damage to the fishing gear, damage to surrounding objects, injury (e.g., the user, neighboring people, neighboring animals, plants, or the like), etc. Casting of the fishing tackle is to be performed in a particular manner to improve capture of fish by entering the body of water at a particular location, causing less than a threshold disturbance of the water upon entry, etc. The casting device is to be swung in a particular manner to avoid hitting other objects, to cause the fishing tackle to be thrown through the air at a particular trajectory (e.g., avoid hitting other objects, go a particular distance, cause the fishing tackle to have a particular velocity or angle at impact of the water, etc.), and to cause the fishing tackle to enter the water at a particular location (e.g., a location where fish are more likely to be captured, avoid locations where the fishing line and/or fishing tackle could get stuck, etc.). For improved angling, a user is to learn and improve casting techniques to avoid problems and to improve capturing of fish.

Conventionally, learning and improving casting techniques is via throwing actual fishing tackle over a body of water using a casting device over and over again through trial and error. This trial and error to learn and improve casting can cause injury to people, animals, and plants. Trial and error to learn and improve casting can cause damage to fishing tackle, fishing line, casting device, equipment, clothing, and the like. Trial and error to learn and improve casting can cause inefficient angling experience for the user that is learning and for other users that are angling due to tangling of fishing lines and/or fishing tackle, scaring away of fish, and the like.

The devices, systems, and methods disclosed herein provide a castable object. In some embodiments, the castable object includes a structure that has a first distal end and a second distal end. The castable object includes a fastener coupled to the first distal end. The fastener is configured to couple to a fishing system (e.g., fishing line, casting device). The castable object includes a first fastening surface attached to at least the second distal end. The first fastening surface is configured to removably attach to a second fastening surface of a target. In some embodiments, the first and second fastening surfaces form a hook and loop system. In some embodiments, the first fastening surface includes loops of a first flexible resilient material secured to a first base sheet material and the second fastening surface includes hooks of a second flexible resilient material secured to a second base sheet material. In some embodiments, the first fastening surface includes hooks of a first flexible resilient material secured to a first base sheet material and the second fastening surface includes loops of a second flexible resilient material secured to a second base sheet material.

The systems, devices, and methods disclosed herein have advantages over conventional solutions. The castable object may be used to learn and improve casting techniques while avoiding injury and damage. The castable object may be used to learn and improve casting techniques without trial and error in actual angling situations where other users and fish may be disturbed.

FIGS. 1A-H illustrate castable objects 100, according to certain embodiments.

A castable object 100 includes a structure 110 that includes a distal ends 112A-B (e.g., first distal end 112A and second distal end 112B). A fastener 120 is attached (e.g., adhered to, screwed into, integral to) to the distal end 112A of the castable object 100. The fastener 120 includes an opening for coupling of a fishing system (e.g., fishing line, swivel, etc.) for casting of the castable object. The fastener 120 may include one or more of an eye bolt, a screw eye, an eyelet, or the like. One distal end of a swivel may be connected to the fastener 120 via the opening of the fastener 120 and a second distal end of the swivel may be connected to fishing line. In some embodiments, castable object 100 has a first distal end 112A including a fastener 120 that is configured to couple to a fishing system. The castable object 100 is to be cast by the fishing system onto a target surface. The castable object may have a second distal end 112B configured to removably attach to the target surface responsive to the castable object 100 being cast onto the target surface. The first distal end 112A may have a first width that is less than a second width of the second distal end 112B.

The distal end 112B may configured to have a larger shape (e.g., larger perimeter) and/or a greater weight than the distal end 112A. In some examples, the structure 110 may be a trapezoidal prism where the bottom face has a greater surface area than the top face. In some examples, the structure has a material of a greater weight proximate the bottom face and material of a lighter weight proximate the top face. In some embodiments, the lateral faces of structure 110 are sloped. In some embodiments, the lateral faces of structure 110 are approximately the same size.

The castable object 100 may have a weight that is substantially similar to the weight of fishing tackle (e.g., lure) used for angling. The castable object 100 may be shaped to have a trajectory substantially similar to that of fishing tackle (e.g., a lure) when thrown through the air. Different castable objects 100 may be configured to each have substantially similar properties (e.g., weight, size, trajectory, air resistance, or the like) of a corresponding fishing tackle (e.g., lure, spinner, fishing tackle with bait, etc.).

Figure 1C:
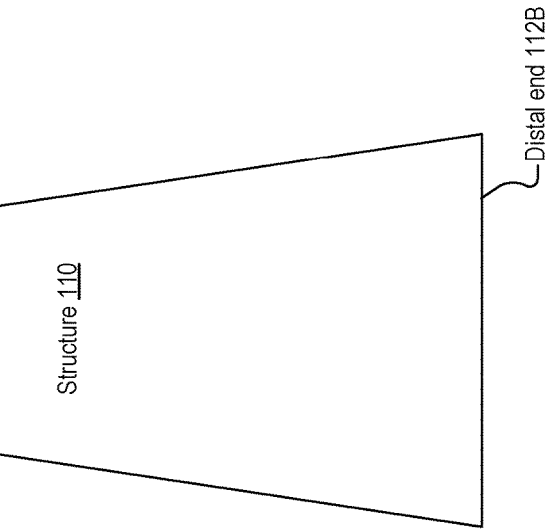
Figure 1A:
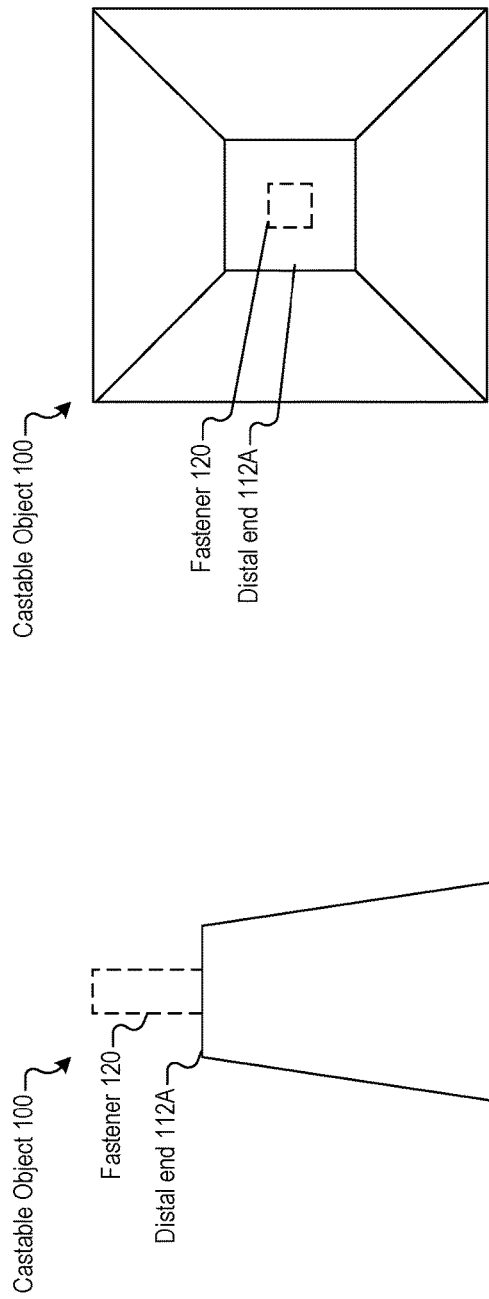

FIG. 1A illustrates a front view of a castable object 100, according to certain embodiments. FIG. 1B illustrates a top view of a castable object 100, according to certain embodiments. FIG. 1C illustrates a bottom view of a castable object 100, according to certain embodiments.

FIG. 1D illustrates a cross-sectional front view of a castable object 100, according to certain embodiments. FIG. 1E illustrates a front view of a castable object 100, according to certain embodiments. The castable object 100 may include a first fastening surface 130 that covers the bottom face and the lateral faces of the structure 110 (e.g., is adhered to one or more surfaces of the structure 110). The first fastening surface 130 may be configured to removably attach to a second fastening surface of a target. In some embodiments, the first fastening surface 130 and second fastening surface form a hook and loop system (e.g., micro hook and loop system). In some embodiments, the first fastening surface 130 and second fastening surface form a removably attaching system (e.g., two part removably attaching system) different from a hook and loop system. In some embodiments, the first fastening surface 130 includes loops of a first flexible resilient material secured to a first base sheet material and the second fastening surface includes hooks of a second flexible resilient material secured to a second base sheet material. In some embodiments, the first fastening surface 130 includes hooks of a first flexible resilient material secured to a first base sheet material and the second fastening surface includes loops of a second flexible resilient material secured to a second base sheet material. In some embodiments, the first fastening surface 130 includes hooks of a first flexible resilient material secured to a first base sheet material and the second fastening surface is a material that forms loops (e.g., fabric, carpet, etc.) to which the first fastening surface may removably attach. The first fastening surface 130 and/or second fastening surface 130 may be a hook layer (e.g., includes hooks of a first flexible resilient material secured to a first base sheet material) or a loop layer (e.g., includes loops of a first flexible resilient material secured to a first base sheet material) that has a thickness of about 0.09-0.125 inches (2.5 mm). In some embodiments, the loop layer may be a fabric or carpet. In some embodiments, the loops and/or hooks are made of one or more of polytetrafluoroethylene (PTFE) (e.g., Teflon™), synthetic material, nylon (e.g., nylon yarn), polyester, polypropylene, synthetic rubber, aramid, and/or plastic.

FIG. 1F illustrates a cross-sectional front view of a castable object 100, according to certain embodiments. FIG. 1G illustrates a front view of a castable object 100, according to certain embodiments. The castable object 100 may include a first fastening surface 130 that covers the bottom face and partially covers one or more lateral faces of the structure 110. For example, the first fastening surface 130 may cover the bottom face, part of a first lateral face, and part of a second lateral face (e.g., leaving exposed the top face, a third lateral face, and a fourth lateral face). The first fastening surface 130 may be configured to removably attach to a second fastening surface of a target (e.g., similar to that of FIGS. 1D-E). The castable object 100 may be configured (e.g., sized, weighted, etc.) so that the bottom face of the castable object 100 contacts a target when the castable object 100 is cast towards the target (e.g., instead of the top face of the castable object 100 contacting the target).

FIG. 1H illustrates a front view of the castable object 100 coupled to a fishing system 140, according to certain embodiments. The fishing system 140 may include a swivel 142 configured to removably couple to the fastener 120 and a fishing line 144 coupled (e.g., tied) to the swivel 142. The fishing line 144 may be coupled to a casting device (e.g., see FIGS. 2A-C).

Figure 2A:
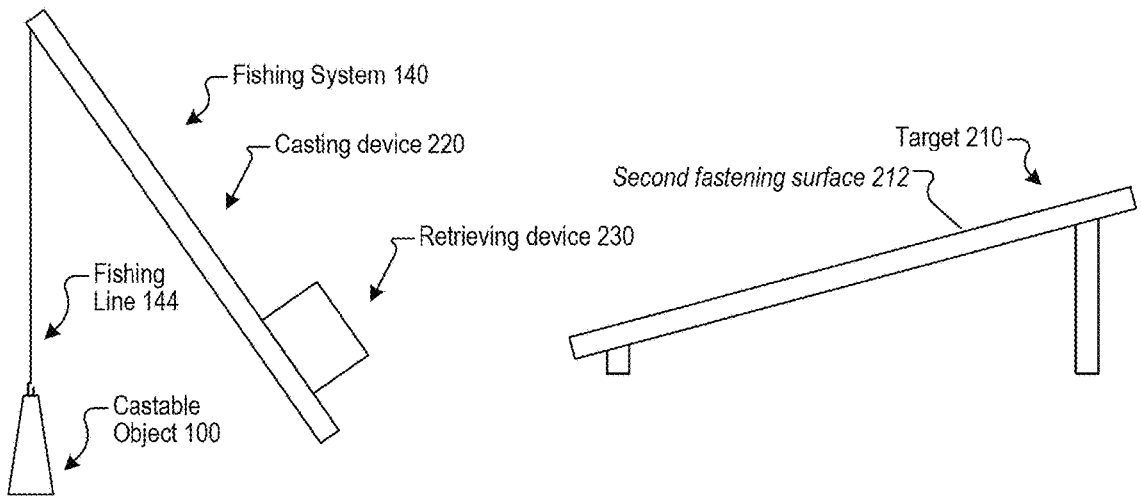
FIGS. 2A-C illustrate a castable object system, according to certain embodiments.
Figure 2B:
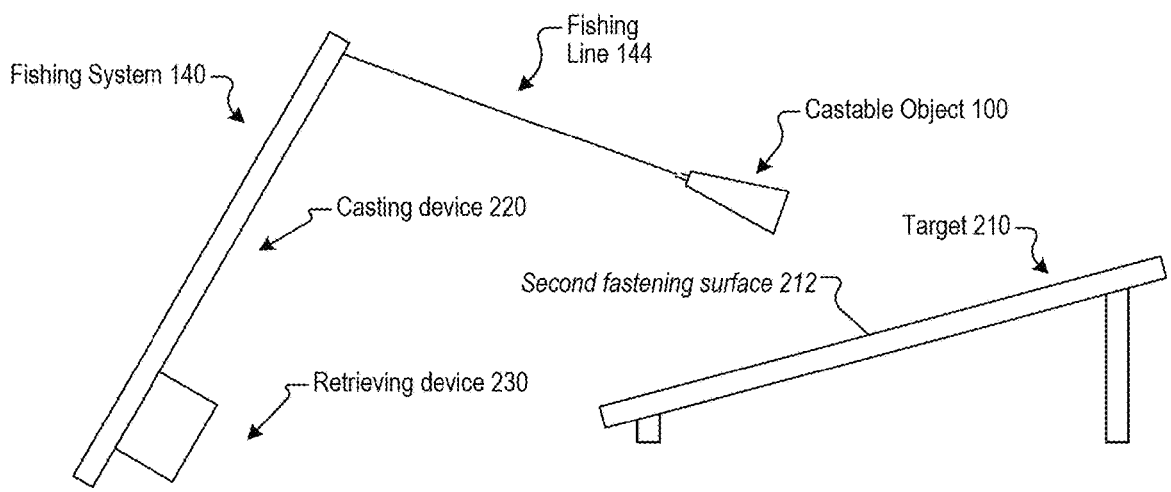
Figure 2C:
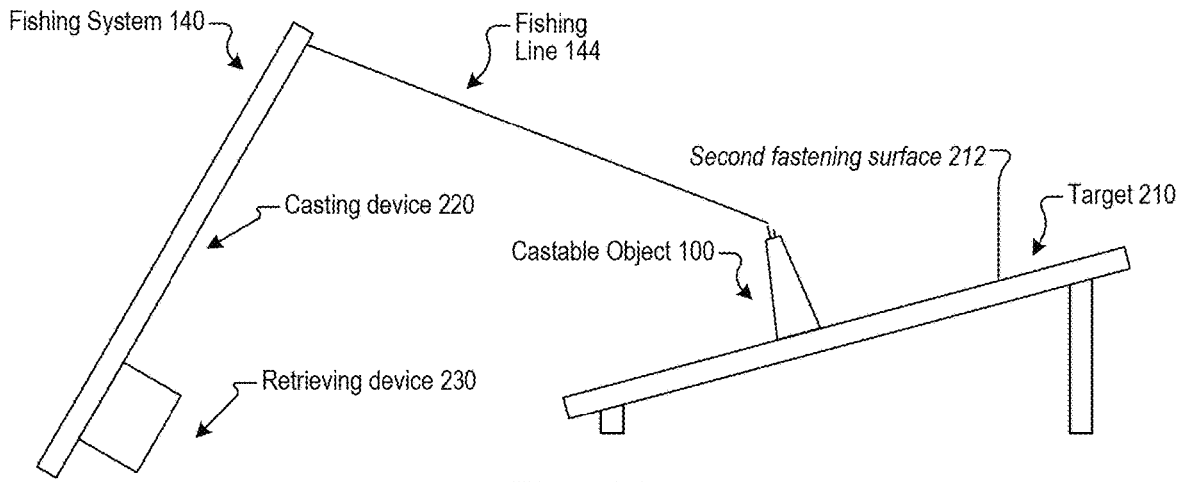

FIGS. 2A-C illustrate a castable object system 200 including a castable object 100, a fishing system 140, and a target 210 (e.g., target system, target assembly, target structure, target object, etc.), according to certain embodiments. The fishing system 140 may include a casting device 220 (e.g., fishing pole) connected to a retrieving device 230 (e.g., fishing reel) that is coupled to a fishing line 144 that is coupled to a swivel 142. The castable object 100 may be removably attached to the swivel 142.

The casting device 220 may be swung (e.g., from a casting back position in FIG. 2A to a casting forward position in FIG. 2B) to throw the castable object 100 towards the target 210. The castable object 100 may fall onto the target 210. The first fastening surface 130 of the castable object may removably attach to a second fastening surface 212 of the target 210. The castable object 100 may be pulled from the target 210 by reeling the fishing line 144 using the retrieving device 230 and/or by manually pulling the fishing line 144. Responsive to pulling the fishing line 144, the castable object 100 may be pulled from the target 210, re-cast towards the target 210, and re-pulled from the target 210 over and over again (e.g., without a user manually removing the castable object 100 from the target 210).

FIGS. 3A-D illustrate targets 210 (e.g., target systems, target assemblies, target structures, target objects, etc.) of castable object systems, according to certain embodiments. A target 210 may include different sections that a user may aim for when casting the castable object 100.

Figure 3A:
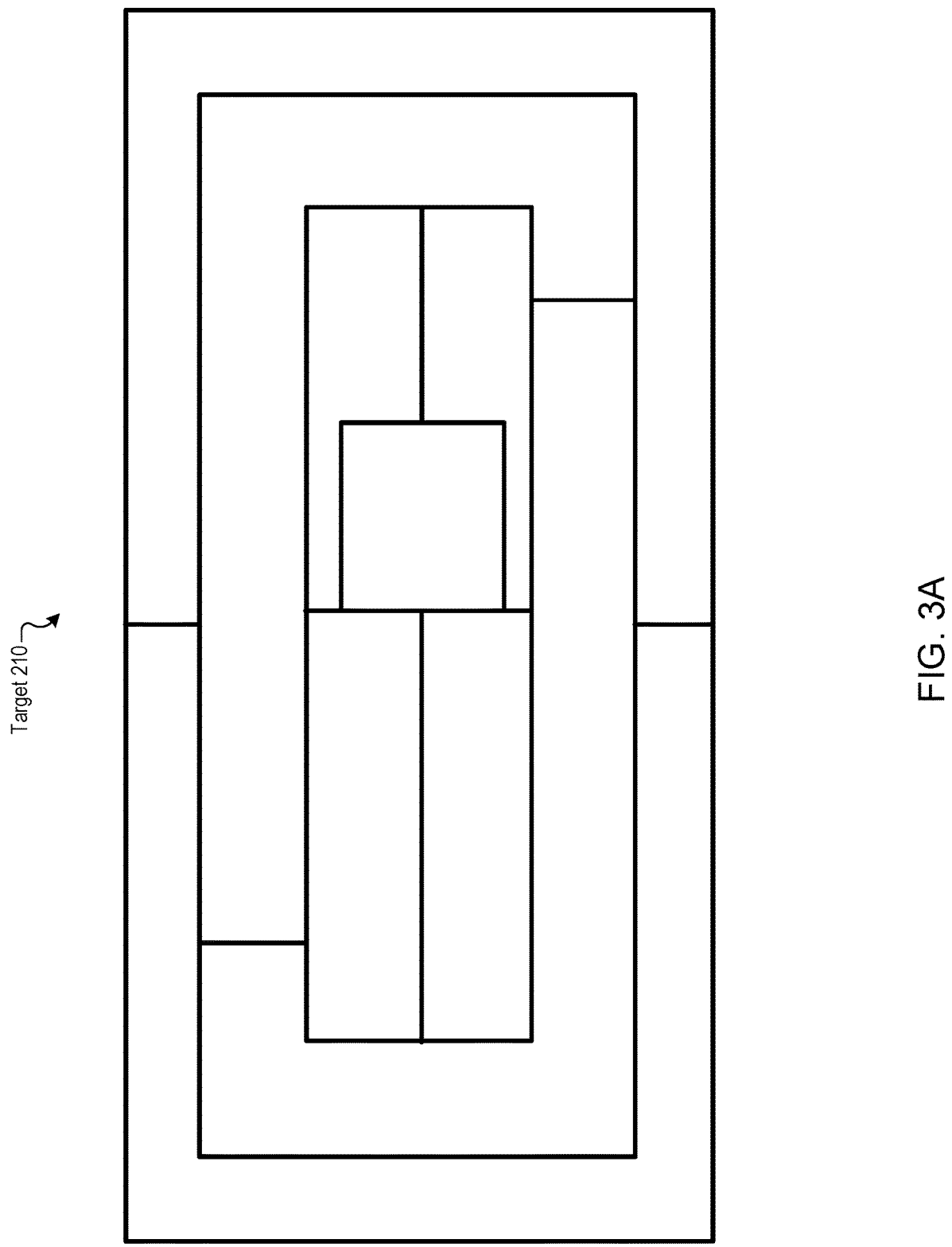
FIGS. 3A-D illustrate targets of castable object systems, according to certain embodiments.

Referring to FIG. 3A, the target 210 may include a cover that is made from a fabric (e.g., to which first fastening surface 130 may removably attach) and that may have different sections (e.g., separated by markings) to which a user can aim when casting.

Figure 3B:
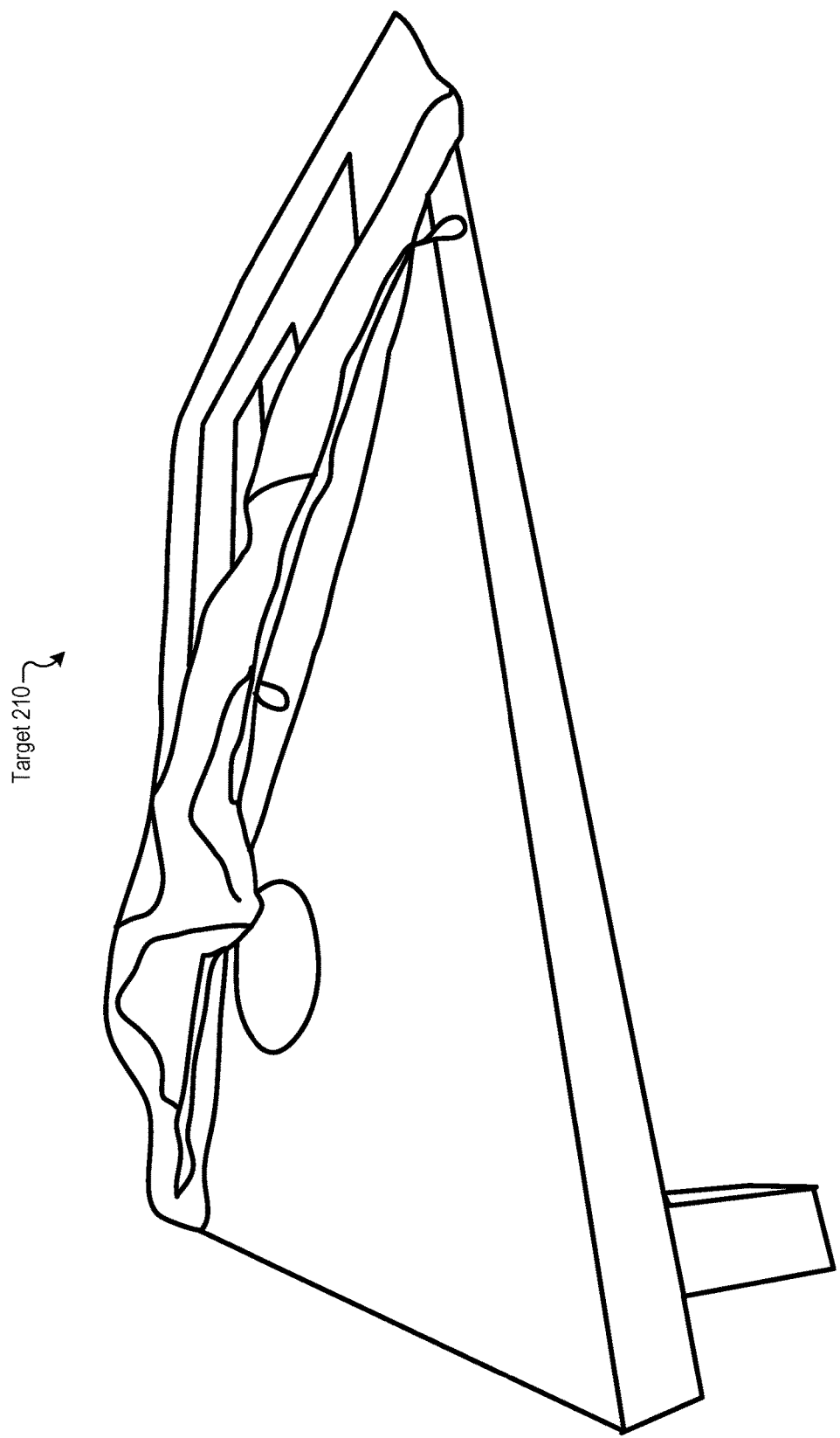

Referring to FIG. 3B, the target 210 may include a target structure over which the cover is placed. In some embodiments, the target structure may have a flat upper surface. In some embodiments, the target structure may have a flat upper surface that is sloped relative to the ground. In some embodiments, the target structure may have a flat upper surface that is substantially parallel to the ground. In some embodiments, the target structure may have two or more legs that cause the flat upper surface to be elevated from the ground. In some embodiments, the target structure is a corn-hole board. The cover may have an upper surface and one or more side surfaces. The one or more side surfaces may be configured (e.g., be fitted, have an elastic band, be substantially the same size as the target structure) to secure to the target structure.

Figure 3C:
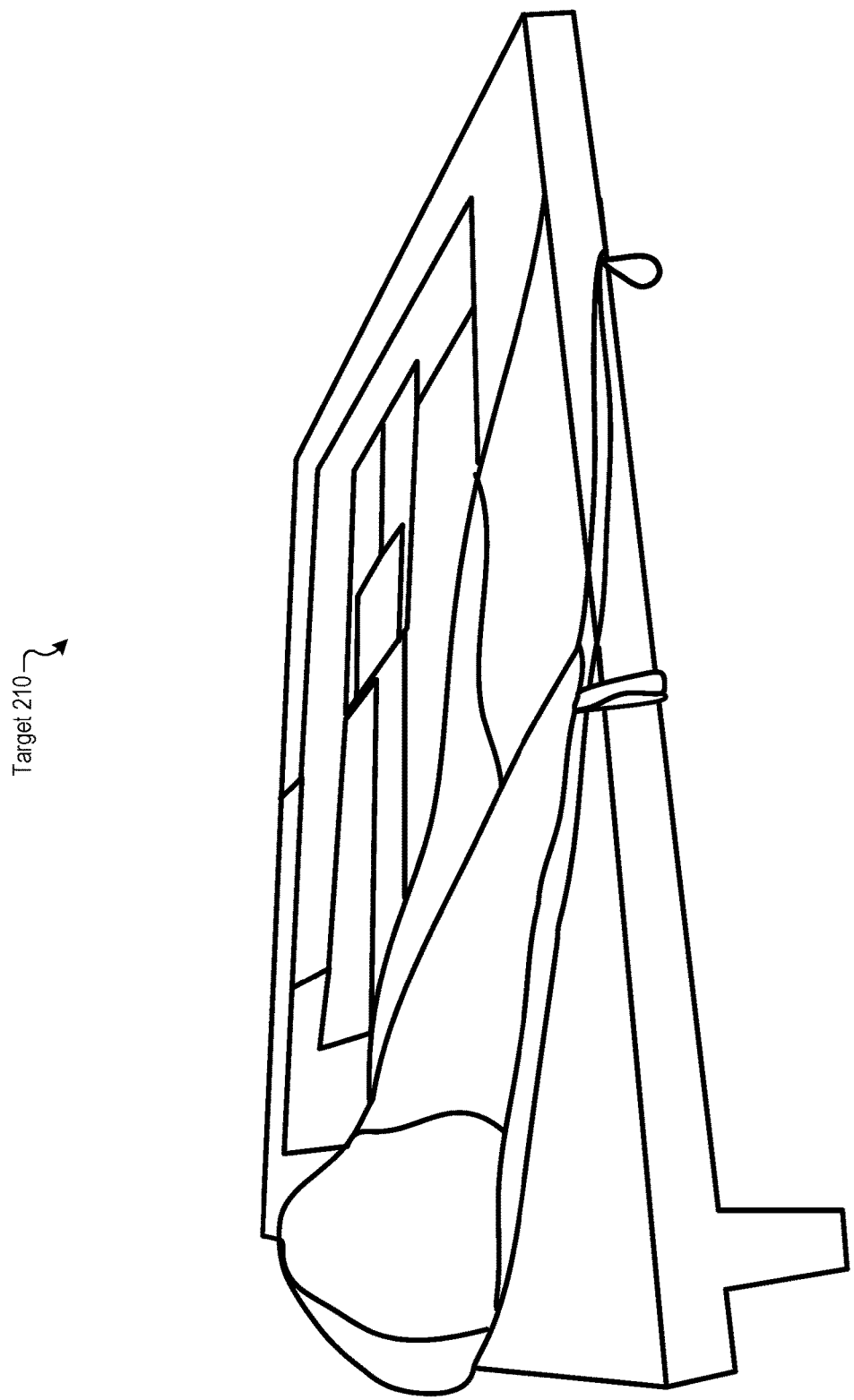
Figure 3D:
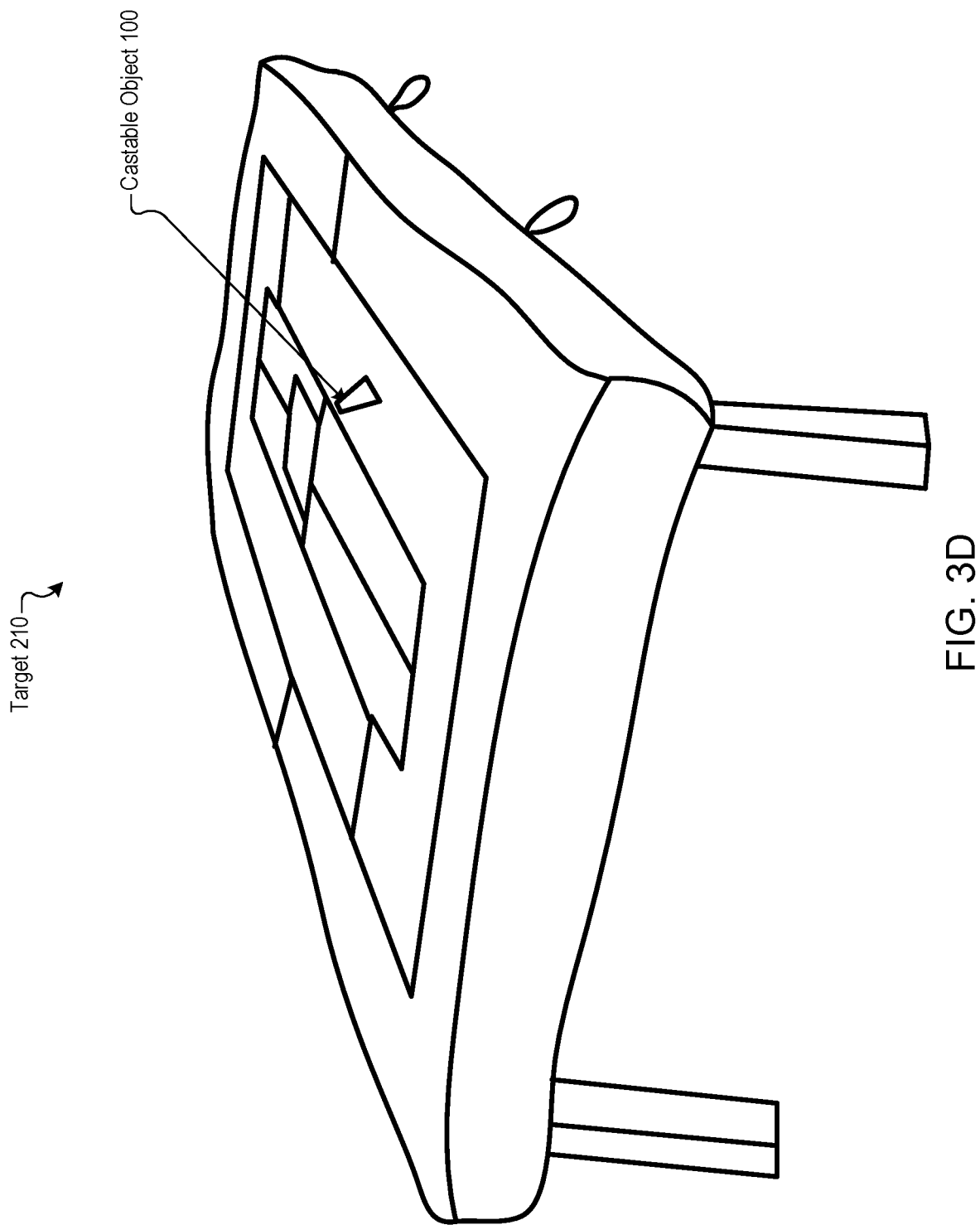

Referring to FIG. 3C, the cover of the target 210 may be stretched to cover the target structure. Referring to FIG. 3D, the cover may secure to the target structure so that one or more castable objects 100 may cast onto the target 210 (e.g., onto the cover) and pulled off of the target 210 without removing the cover.

In some embodiments, the castable object 100 is used in a fishing game to teach and improve casting. The castable object may be used in a backyard fish casting game, where the goal is to accurately cast the castable object 100 (e.g., an attachable object (lure)) and land it on a target 210 (e.g., target board) to earn points, where more points are awarded for more accurate casts. The castable object 100 may be used with an existing casting device 220 (e.g., with a user's existing fishing pole/reel combo). The castable object 100 may be used in a game designed for home/backyard use. The castable object 100 and target 210 may allow the game to be safe for use (e.g., for ages of five years and up). In some embodiments, anywhere from 1 to 5 players may play simultaneously. The castable object 100 and target 210 may allow the game to be enjoyable, help to improve participants casting accuracy, and this skill progression may be enhanced because the castable objects 100 are configured and designed to mimic the weight and feel of actual fishing lures. This allows anglers of all ages to approach their future fishing adventures with more confidence.

In some embodiments, the target 210 is a circular or square target board with second fastening surface 212 (e.g., a sticky polyester fabric) to which a castable object 100 (e.g., lure wrapped into Velcro®) is to attach. The target 210 (e.g., board) is designed with a pattern similar to a dart board, and gameplay may have similarities to that of darts. The game may have an alternate scoring method/game. In this alternate game small segments of the target 210 (e.g., board) correspond to corresponding specific species of fish (e.g., 11 in total) that to win players are to hit each part of the target 210 (e.g., board) corresponding to each specific fish species.

In some embodiments, users have two options to attach the cover of the target 210 for gameplay. In some embodiments, the target 210 is a rectangular design game board that mimics the size and proportions of a traditional corn-hole set (e.g., 2 ft W×4 ft H) and has an elastic exterior similar to a fitted bedsheet. This allows the fabric game board to be attached directly to an existing corn-hole set by attaching to the upper surface. If a user does not already own a corn-hole set, a rigid backing may be built from materials (e.g., materials that are inexpensive and readily available at retail stores). In some embodiments, an accordion style back may be used with the cover to form the target 210.

In some embodiments, the target 210 has an upper layer made of felt, cloth, carpeting, or the like and the target surface is the top portion of the upper layer. In some embodiments, the target 210 has one or more magnetic objects disposed under the upper layer of the target 210 and the castable object 100 is configured to removably attach to the target 210 via magnetic attraction (e.g., by attaching a ferromagnetic object to the castable object 100, the castable object 100 includes a ferromagnetic object, a ferromagnetic object is disposed within the castable object, etc.). In some embodiments, at least a portion of the castable object 100 (e.g., distal end 112B) and at least a portion of the target 210 are configured to removably attach to each other via magnetic attraction. In some embodiments, the castable object 100 and/or the target 210 includes a magnet and/or a material that is attracted to a magnet (e.g., ferromagnetic material). In some examples, the castable object 100 includes a magnet and the target 210 includes a material that is attracted to a magnet. In some examples, the castable object 100 includes a material that is attracted to a magnet and the target 210 includes a magnet. In some examples, the castable object 100 includes a magnet and the target 210 includes a magnet.

In some embodiments, multiple (e.g., six) castable objects 100 (e.g., lures) of different weights (e.g., 1/32nd oz., 1/8th oz., 3/8th oz., 1/2 oz., or the like), sizes, and/or shapes are used. The castable object 100 may have a solid rubber material (e.g., structure 110) as the core with a metal eye (e.g., fastener 120) attaching to the core (e.g., structure 110). This structure 110 (e.g., rubber lure) may be wrapped in a first fastening surface 130 (e.g., Velcro®), allowing the castable object 100 to stick to the target 210 (e.g., fabric game board).

In some embodiments, the castable objects 100 (e.g., soft lures) may be attached to existing fishing line via traditional fishing swivels.

In some embodiments, detailed instructions may be included such as one or more of: 1) traditional dart-board style game ideas; 2) unique Cast-a-Way Legendary Fish Challenge game instructions; 3) instructions on how to build a rigid backing board if needed; and/or 4) a pad of loose paper to keep score.

The castable object 100 and target 210 may be used to learn and improve casting (e.g., via a game) in a way that has technical advantages and improvements over conventional learning and improving of casting.

The castable object 100 may be cast to the target 210, removed from the target 210, and re-cast to the target 210 over and over without repositioning the target 210 (e.g., the castable object 100 does not pull the target 210 towards the user, the target 210 remains in place). In so doing, the user may remain in place as the user casts without walking and replacing the object. This allows more creative gameplay, including gameplay with similarities to the rules of darts, similarities to the back-yard bean bag game corn-hole, and/or the expansion game of catching specific species of fish corresponding to specific parts of the target 210.

Compared to darts, the castable object 100 has a fastener (e.g., eyelet) and is retrieved by the user via the casting device 220 (e.g., reeling the fishing pole). Also, the castable objects 100 may be soft and contain no sharp or hard edges, making the castable objects much safer for younger users to play than darts.

Compared to corn-hole, the user remains in place and can retrieve their own castable object 100 by reeling it in with their existing casting device 220 (e.g., pole/reel combo). Also, unlike corn-hole, castable objects 100 contain fasteners 120 (e.g., metal eyelets) that are easily attached to a conventional swivel and thus be attached to a casting device 220 (e.g., fishing pole/reel). In addition, the castable object 100 may be used more dynamically (e.g., via a game that is more dynamic in scoring and gameplay). Corn-hole has one object, to get the bean bag in the hole, whereas the castable object 100 can be used by a user in a variety of scoring methods (e.g., traditional existing dart scoring games and/or the unique legendary fish species game).

The design of the castable object 100, target 210, and gameplay also have technical advantages over conventional systems. The design of the castable object 100 (e.g., casting lure) including the fastener 120 (e.g., mounting metal eyehole) and being wrapped in a first fastening surface 130 (e.g., Velcro®) has technical advantages over conventional devices. The castable object 100 can be removed from the target 210 via a casting device 220 (e.g., fishing rod/reel) without approaching the target 210 and manually removing the castable object 100 from the target 210.

The castable object 100 and target 210 may be used to cast and "catch" fish species as the user lands the castable object 100 on the target 210 associated with the multiple different fish species (e.g., eleven fish species).

In some embodiments, the castable object 100 includes an electronic device (e.g., a radio-frequency identification (RFID) tag, near field communication (NFC) tag) and the target 210 includes one or more sensors (e.g., RFID sensor, NFC sensor). In some embodiments, the castable object 100 and/or the target 210 includes a processing device. The processing device automatically receives sensor data from the one or more sensors and automatically determines, based on the sensor data, that the castable object 100 landed on a portion of the target 210. The processing device may automatically score points for users as the processing device tracks castable objects 100 that landed on the target 210.

In some embodiments, the castable object 100 and/or target 210 has lights for use after dark. The target 210 may include lights that illuminate one or more portions of the target structure. The target 210 may include board line point demarcations that are illuminated (e.g., includes lights). The castable object 100 may include one or more lights to illuminate the castable object 100

The castable object 100 and/or target 210 with lights may be provided as a stand-alone game or the lights may be provided as an accessory kit to convert the castable object 100 and/or target 210 to be illuminated to be used as a night game.

In some embodiments, satellite targets (e.g., multiple targets 210) may be set up around the target 210 (e.g., board), creating different scorable targets in addition to the game board.

In some embodiments, the same target 210 and gameplay be used and instead of casting the castable object 100 with a casting device 220, the castable object is tossed by hand (e.g., bean bags with Velcro®).

In some embodiments, the targets 210 may be a variety of sizes and shapes.

In some embodiments, the castable object 100 and target 210 may be used to play a game (e.g., legendary fish game) where the target 210 has multiple sections and each section illustrates a respective identifier (e.g., number, outline, image, etc.) associated with different fish. For example, eleven legendary fish species may be indicated at different locations on the target 210. Once the castable object 100 lands on a corresponding section of the target 210, the user will have "caught" that species and can move on to the next one. In other options of gameplay, each user may call out which species to catch and the players will keep casting until the section corresponding to the species is hit by a castable object 100. Each identifier (e.g., numbers) on the target 210 may indicate a different species, such as: 1) Largemouth Bass; 2) Smallmouth Bass; 3) Crappie; 4) Bullhead Catfish; 5) Pike; 6) Muskie; 7) Steelhead Trout; 8) Perch; 9) Sockeye Salmon; 10) Bluegill; 11) Sturgeon; and/or the like.

In some embodiments, users may choose a weighted castable object 100 (e.g., weighted lure) and cast the weighted castable object 100 onto the target 210 (e.g., board) with the goal of scoring as many points as possible (e.g., traditional gameplay). A user may score points when the castable object 100 lands on the corresponding section of the target 210. Users can choose to play with a set number of casts (e.g., ten casts and highest points) and whoever has the most points at the end of the set number of casts wins. In some embodiments, the game options is to play to a certain number and the first to score a total number of points wins (e.g., the first to 301 points wins). In some embodiments, the session is timed and whichever user has the most points at the end of the time wins. For example, a time can be set for two minutes and each player can cast as much as they can, racking up points and the highest point total wins.

In some embodiments, instructions to build rigid backing may be provided (e.g., for users that do not have a corn-hole set). A sheet of plywood may be obtained (e.g., from a local department store, from the lumber section, for a low cost). The plywood may be cut to the dimensions (e.g., 4 ft H×2 ft W) (e.g., at home or by the store). The cover of the target 210 may be wrapped around the plywood (e.g., cut to the dimensions) using the elastic edging to be used with the castable object 100.

Figure 4A:
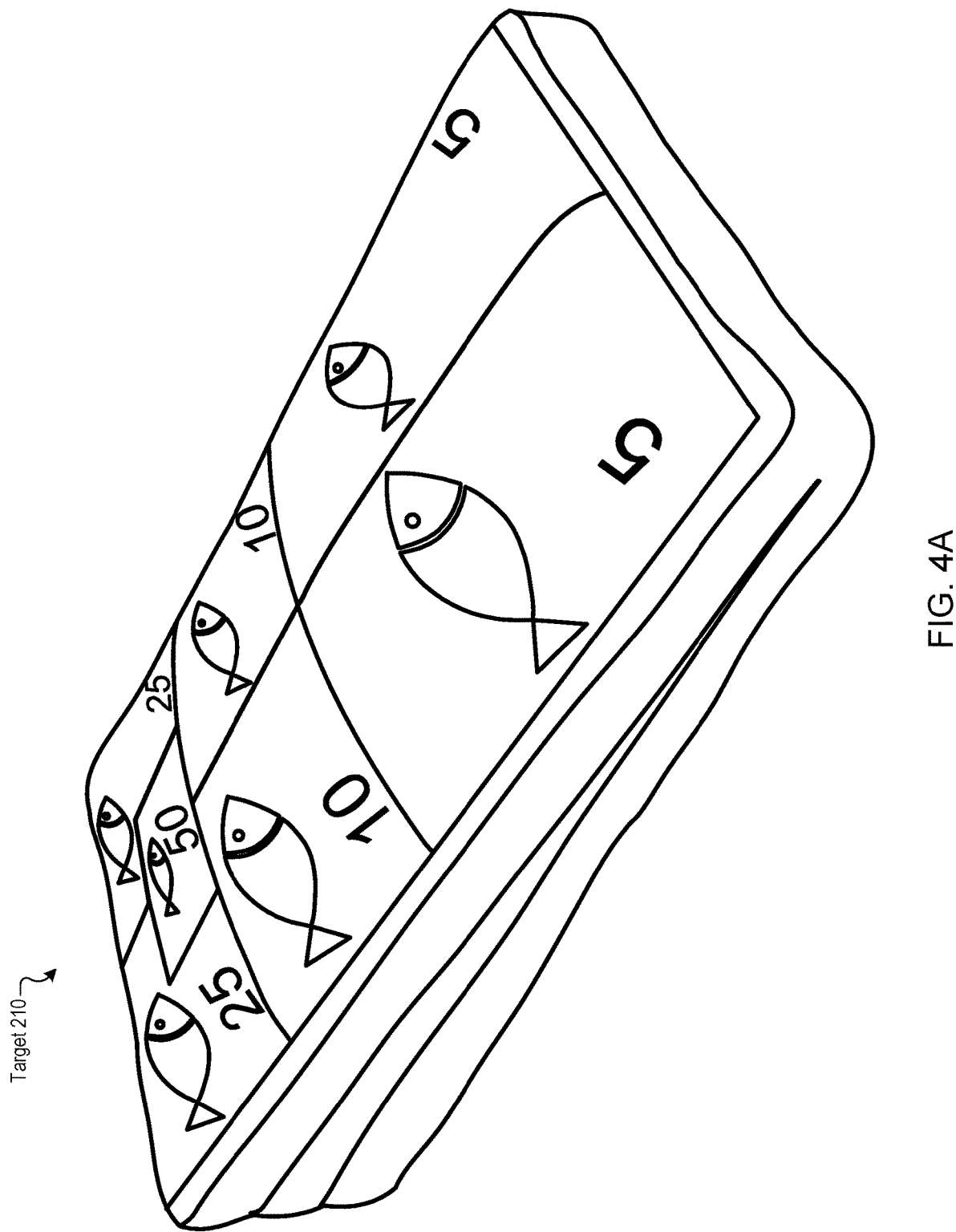
FIGS. 4A-C illustrate targets of castable object systems, according to certain embodiments.
Figure 4B:
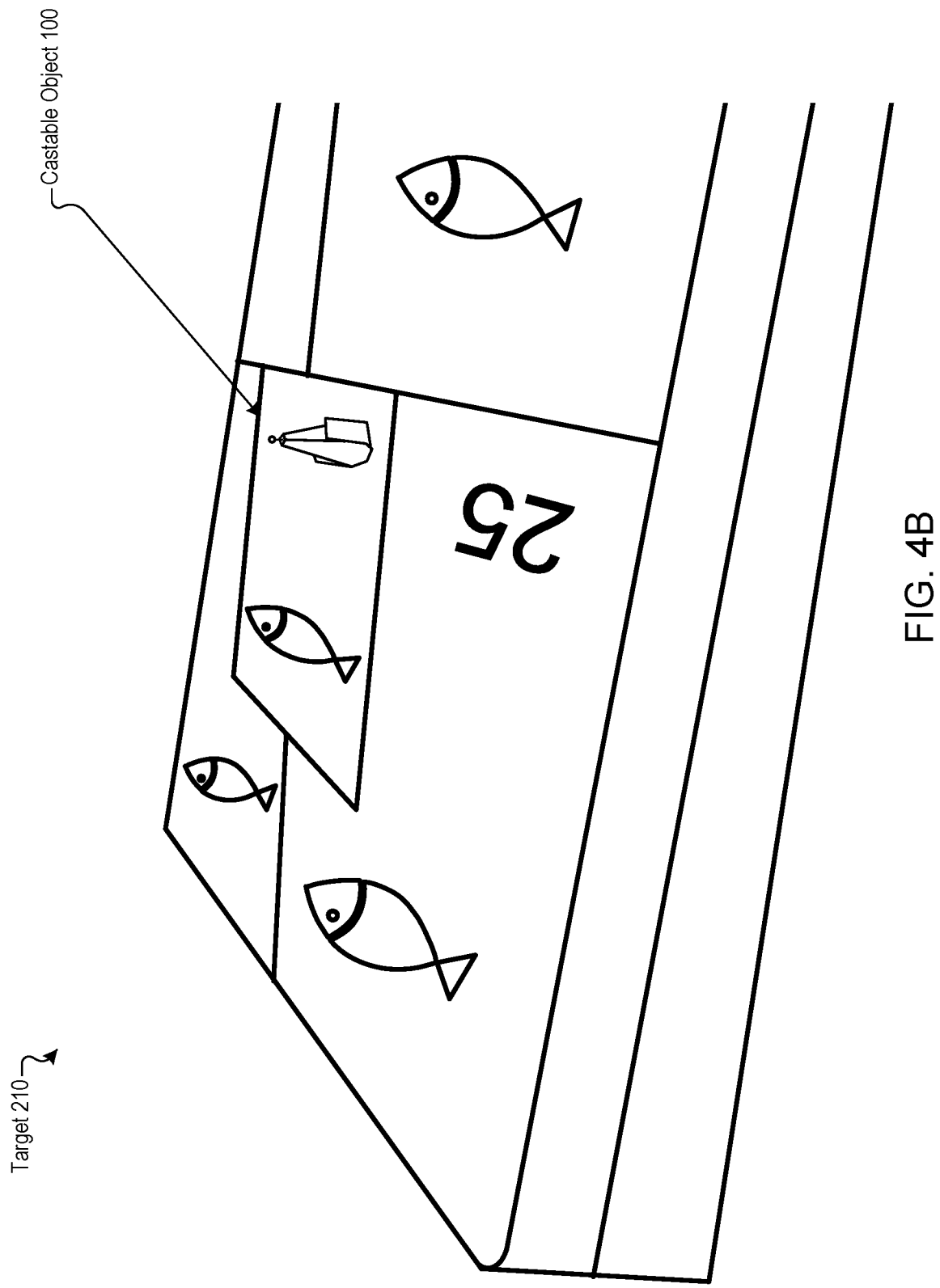
Figure 4C:
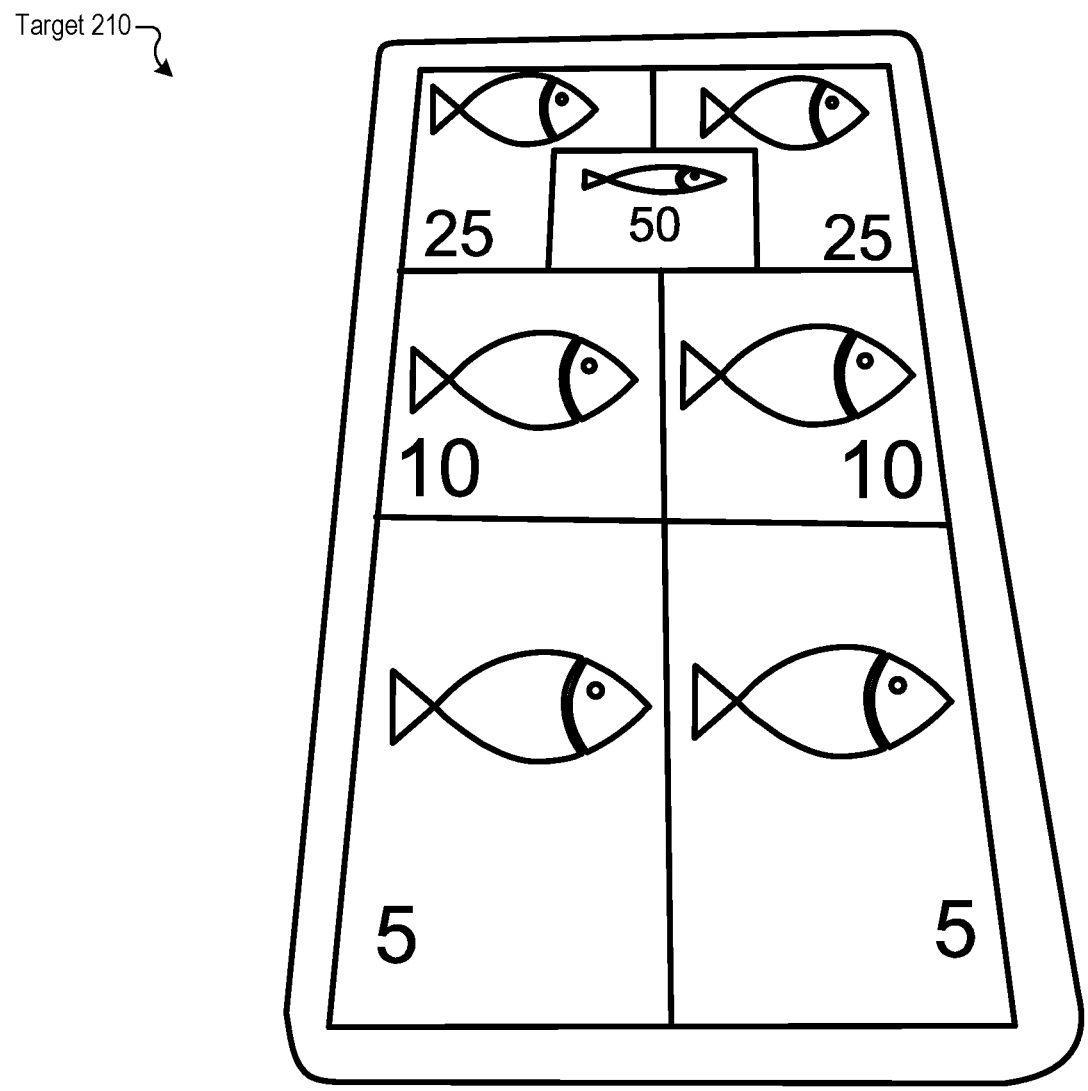

FIGS. 4A-C illustrate targets 210 (e.g., target systems, target assemblies, target structures, target objects, etc.) of castable object systems, according to certain embodiments. A target 210 may include different sections that a user may aim for when casting the castable object 100.

In some embodiments, the target 210 is an inflatable structure that includes framing (e.g., piping, polyvinyl chloride (PVC) piping, etc.) and a material that includes second fastening surface 212 (e.g., Velcro®, hooks, loops, etc.). In some embodiments, the target 210 is configured to float and can be used on land and/or in the water. In some embodiments, the target 210 is configured to couple to an anchor system (e.g., to maintain the target 210 in a location or within an area).

In some embodiments, one or more of the targets 210 of a castable object system can be used with different types of objects. In some examples, a target 210 is used with a castable object 100 and/or a throwable object (e.g., hand-tossed bean bag, etc.).

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A castable object comprising:
   a structure comprising:
      a first distal end having a first substantially planar face;
      a second distal end having a second substantially planar face;
      a first substantially planar lateral face;
      a second substantially planar lateral face opposite the first substantially planar lateral face;
      a third substantially planar lateral face disposed between the first substantially planar lateral face and the second substantially planar lateral face, the third substantially planar lateral face being adjacent to the first substantially planar lateral face and adjacent to the second substantially planar lateral face; and
      a fourth substantially planar lateral face opposite the third substantially planar lateral face, the fourth substantially planar lateral face being disposed between the first substantially planar lateral face and the second substantially planar lateral face, the fourth substantially planar lateral face being adjacent to the first substantially planar lateral face and adjacent to the second substantially planar lateral face, the first substantially planar lateral face being disposed between the fourth substantially planar lateral face and the third substantially planar lateral face, the second substantially planar lateral face being disposed between the third substantially planar lateral face and the fourth substantially planar lateral face, wherein:
      the first substantially planar lateral face, the second substantially planar lateral face, the third substantially planar lateral face, and the fourth substantially planar lateral face are adjacent to the first substantially planar face of the first distal end and substantially at or at the second substantially planar face of the second distal end;
      the second substantially planar face has a greater surface area than the first substantially planar face;
      a first portion of the structure proximate the second distal end has a greater weight than a second portion of the structure proximate the first distal end, such that the second substantially planar face of the second distal end is configured to contact a target responsive to casting the castable object;
      the castable object is configured to have a plurality of properties that are substantially similar to that of fishing tackle, the plurality of properties comprising size, trajectory, and air resistance, the fishing tackle being one or more of a lure, a spinner, or fishing tackle securing bait; and
      the first substantially planar face, the second substantially planar face, the first substantially planar lateral face, the second substantially planar lateral face, the third substantially planar lateral face, and the fourth substantially planar lateral face substantially form a trapezoidal prism, wherein each of the first substantially planar lateral face, the second substantially planar lateral face, the third substantially planar lateral face, and the fourth substantially planar lateral face comprise a corresponding perimeter consisting of a corresponding first edge, a corresponding second edge, a corresponding third edge, and a corresponding fourth edge, wherein no other edges or faces are within the corresponding perimeter;
   a fastener coupled to the first distal end of the structure, wherein:
      the fastener comprises an eye bolt, screw eye, or eyelet; and
      the fastener is configured to couple to a fishing system comprising a casting device connected to a retrieving device; and
   a first continuous fastening structure attached to the second substantially planar face of the second distal end of the structure, the first substantially planar lateral face, and the second substantially planar lateral face without being attached to the third substantially planar lateral face and the fourth substantially planar lateral face, wherein:
      the first continuous fastening structure comprises a first flexible resilient material secured to a first continuous base sheet material;
      the first flexible resilient material comprises a plurality of hooks or a plurality of loops;
      the castable object is configured to be cast by the fishing system onto the target;
      the first continuous fastening structure is configured to removably attach to a second fastening surface of the target; and
      the first continuous fastening structure is configured to disengage from the second fastening surface of the target responsive to the retrieving device retracting a fishing line coupled to the fastener.

2. The castable object of claim 1, wherein:
   the first flexible resilient material comprises one of the plurality of loops that are configured to removably attach to a plurality of hooks of a second flexible resilient material of the second fastening surface of the target or the plurality of hooks that are configured to removably attach to a plurality of loops of a second flexible resilient material of the second fastening surface of the target, the second flexible resilient material being secured to a second base sheet material of the second fastening surface of the target.

3. The castable object of claim 1, wherein:
the fastener is configured to be coupled to the structure by being adhered to the structure or by being screwed into the structure.

4. The castable object of claim 1, wherein:
the fastener is configured to couple to the fishing system via the fishing line that is configured to the retrieving device.

5. The castable object of claim 1, wherein:
the fastener is configured to couple to the fishing system via a swivel comprising a first distal end and a second distal end;
the first distal end of the swivel is coupled to the fishing line that is coupled to the retrieving device; and
the fastener is configured to removably attach to the second distal end of the swivel.

6. A system comprising:
a castable object comprising:
a structure comprising:
a first distal end having a first substantially planar face;
a second distal end having a second substantially planar face;
a first substantially planar lateral face;
a second substantially planar lateral face opposite the first substantially planar lateral face;
a third substantially planar lateral face disposed between the first substantially planar lateral face and the second substantially planar lateral face, the third substantially planar lateral face being adjacent to the first substantially planar lateral face and adjacent to the second substantially planar lateral face; and
a fourth substantially planar lateral face opposite the third substantially planar lateral face, the fourth substantially planar lateral face being disposed between the first substantially planar lateral face and the second substantially planar lateral face, the fourth substantially planar lateral face being adjacent to the first substantially planar lateral face and adjacent to the second substantially planar lateral face, the first substantially planar lateral face being disposed between the fourth substantially planar lateral face and the third substantially planar lateral face, the second substantially planar lateral face being disposed between the third substantially planar lateral face and the fourth substantially planar lateral face, wherein:
the first substantially planar lateral face, the second substantially planar lateral face, the third substantially planar lateral face, and the fourth substantially planar lateral face are adjacent to the first substantially planar face of the first distal end and adjacent to the second substantially planar face of the second distal end;
the second substantially planar face has a greater surface area than the first substantially planar face;
a first portion of the structure proximate the second distal end has a greater weight than a second portion of the structure proximate the first distal end, such that the second substantially planar face of the second distal end is configured to contact a target structure responsive to casting the castable object;
the castable object is configured to have a plurality of properties that are substantially similar to that of fishing tackle, the plurality of properties comprising size, trajectory, and air resistance, the fishing tackle being one or more of a lure, a spinner, or fishing tackle securing bait; and
the first substantially planar face, the second substantially planar face, the first substantially planar lateral face, the second substantially planar lateral face, the third substantially planar lateral face, and the fourth substantially planar lateral face substantially form a trapezoidal prism;
a fastener coupled to the first distal end of the structure, wherein:
the fastener comprises an eye bolt, screw eye, or eyelet; and
the fastener is configured to couple to a fishing system comprising a casting device connected to a retrieving device; and
a first continuous fastening structure attached to the second substantially planar face of the second distal end of the structure, the first substantially planar lateral face, and the second substantially planar lateral face without being attached to the third substantially planar lateral face and the fourth substantially planar lateral face, wherein:
the first continuous fastening structure comprises a first flexible resilient material secured to a first continuous base sheet material; and
the first flexible resilient material comprises a plurality of hooks or a plurality of loops; and
the target structure comprising a second fastening surface, wherein the castable object is configured to be cast by the fishing system onto the target structure, and wherein the first continuous fastening structure is configured to removably attach to the second fastening surface and disengage from the second fastening surface responsive to the retrieving device retracting a fishing line coupled to the fastener.

7. The system of claim 6, wherein:
the second fastening surface of the target structure comprises a plurality of sections and each of the plurality of sections illustrates a respective identifier; and
the castable object is configured to be cast onto and removably attach to a corresponding section that has the respective identifier.

8. The system of claim 6, wherein the castable object is configured to removably couple to a first distal end of a swivel, wherein a second distal end of the swivel is coupled to the fishing line of the fishing system.

9. The system of claim 8 further comprising a second castable object configured to be cast onto and removably attach to the second fastening surface of the target structure, wherein the castable object and the second castable object are configured to removably couple to the first distal end of the swivel, wherein the second castable object has one or more of a different weight, size, or shape than the castable object.

10. The system of claim 6, wherein:
the castable object comprises one or more first lights configured to illuminate the castable object; and
the target structure comprises one or more second lights configured to illuminate one or more portions of the target structure.

11. The system of claim 6, wherein:
the castable object comprises one or more of a radio-frequency identification (RFID) tag or a near field communication (NFC) tag; and
the target structure comprises one or more of RFID sensors or NFC sensors.

12. The system of claim 11, wherein a processing device is configured to:
receive sensor data from at least one sensor of the one or more of RFID sensors or the NFC sensors; and
determine, based on the sensor data, a section of the target structure onto which the castable object landed responsive to being cast by the fishing system.

13. A castable object comprising:
a structure comprising:
a first distal end having a first substantially planar face, wherein:
the first substantially planar face comprises a fastener;
the fastener comprises an eye bolt, screw eye, or eyelet configured to couple to a fishing system;
the fishing system comprises a casting device connected to a retrieving device, wherein the castable object is to be cast by the fishing system onto a target surface;
the target surface is a top portion of an upper layer of a target structure; and
the upper layer comprises felt, cloth, or carpeting;
a second distal end having a second substantially planar face, wherein:
the first distal end has a first width that is less than a second width of the second distal end; and
a portion proximate to the second distal end has a greater weight than a portion proximate to the first distal end, such that the second substantially planar face of the second distal end is configured to contact the target surface responsive to casting the castable object;
a first substantially planar lateral face;
a second substantially planar lateral face opposite the first substantially planar lateral face;
a third substantially planar lateral face disposed between the first substantially planar lateral face and the second substantially planar lateral face, the third substantially planar lateral face being adjacent to the first substantially planar lateral face and adjacent to the second substantially planar lateral face; and
a fourth substantially planar lateral face opposite the third substantially planar lateral face, the fourth substantially planar lateral face being disposed between the first substantially planar lateral face and the second substantially planar lateral face, the fourth substantially planar lateral face being adjacent to the first substantially planar lateral face and adjacent to the second substantially planar lateral face, the first substantially planar lateral face being disposed between the fourth substantially planar lateral face and the third substantially planar lateral face, the second substantially planar lateral face being disposed between the third substantially planar lateral face and the fourth substantially planar lateral face, wherein:
the first substantially planar lateral face, the second substantially planar lateral face, the third substantially planar lateral face, and the fourth substantially planar lateral face are adjacent to the first substantially planar face of the first distal end and substantially at or at the second substantially planar face of the second distal end; and
the first substantially planar face, the second substantially planar face, the first substantially planar lateral face, the second substantially planar lateral face, the third substantially planar lateral face, and the fourth substantially planar lateral face substantially form a trapezoidal prism, wherein each of the first substantially planar lateral face, the second substantially planar lateral face, the third substantially planar lateral face, and the fourth substantially planar lateral face comprise a corresponding perimeter consisting of a corresponding first edge, a corresponding second edge, a corresponding third edge, and a corresponding fourth edge, wherein no other edges or faces are within the corresponding perimeter;
the castable object is configured to have a plurality of properties that are substantially similar to that of fishing tackle, the plurality of properties comprising size, trajectory, and air resistance, the fishing tackle being one or more of a lure, a spinner, or fishing tackle securing bait; and
a first continuous fastening structure comprising a plurality of hooks or loops of a first flexible resilient material secured to a first continuous base sheet material, wherein:
the first continuous fastening structure is attached to the second substantially planar face of the second distal end, the first substantially planar lateral face, and the second substantially planar lateral face without being attached to the third substantially planar lateral face and the fourth substantially planar lateral face;
the first continuous fastening structure is configured to removably attach to a second fastening surface of the target surface; and
the first continuous fastening structure is configured to disengage from the second fastening surface of the target surface responsive to the retrieving device retracting a fishing line coupled to the fastener.

14. The castable object of claim 13, wherein:
the fishing line is coupled to the retrieving device and the fastener of the castable object.

15. The castable object of claim 14, wherein:
the fishing system further comprises a swivel comprising a first distal end and a second distal end;
the first distal end of the swivel is coupled to the fishing line; and the fastener is configured to removably attach to the second distal end of the swivel.

16. The castable object of claim 13, wherein:
the target structure further comprises one or more magnetic objects disposed under the upper layer; and
at least the second substantially planar face of the second distal end of the castable object is configured to removably attach to the target surface of the target structure via magnetic attraction.

17. The castable object of claim 1, wherein:
each of the first substantially planar lateral face, the second substantially planar lateral face, the third substantially planar lateral face, and the substantially planar fourth lateral face have substantially same size; and a shape of the castable object is configured to have the trajectory substantially similar to that of the fishing tackle responsive to being thrown through air.

18. The castable object of claim 1, wherein:

a majority of the first portion of the structure that has the greater weight is covered by the first continuous fastening structure; and a majority of the second portion of the structure that has a lesser weight is not covered by the first continuous fastening structure.

19. The castable object of claim 1, wherein responsive to casting the castable object onto the target, the second substantially planar face of the second distal end is configured to contact the target and removably attach to the target based on:

the first portion of the structure proximate the second distal end having the greater weight than the second portion of the structure proximate the first distal end; and the first continuous fastening structure being attached to the second substantially planar face of the second distal end of the structure, the first substantially planar lateral face, and the second substantially planar lateral face without being attached to the third substantially planar lateral face and the fourth substantially planar lateral face.

* * * * *